March 18, 1924.

J. A. BARRIER

PISTON RING

Filed July 19, 19..

1,487,306

Inventor
Joseph A. Barrier.

By Harry C. Schroeder
Attorney

Patented Mar. 18, 1924.

1,487,306

UNITED STATES PATENT OFFICE.

JOSEPH A. BARRIER, OF OAKLAND, CALIFORNIA.

PISTON RING.

Application filed July 19, 1920. Serial No. 397,464.

*To all whom it may concern:*

Be it known that I, JOSEPH A. BARRIER, a citizen of the United States, residing at Oakland, in the county of Alameda and State of California, have invented certain new and useful Improvements in Piston Rings, of which the following is a specification.

My invention is an improved piston packing ring which expands into contact with the cylinder and into contact with the sides of the piston grooves.

Referring to the annexed drawing which forms a part of this specification:

The parts of my invention are designated in the drawing by the same reference characters as those designating corresponding parts in this specification.

Figure 1:
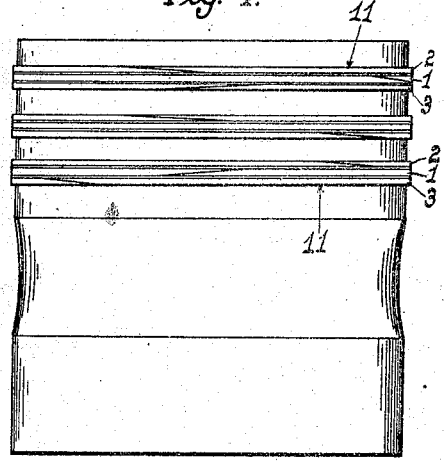
Figure 1 is a side view of a piston in the grooves of which are contracted three of my packing rings.
Figure 2:
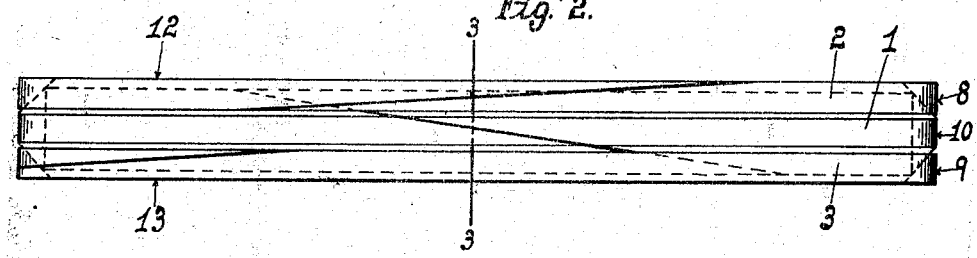
Figure 2 is a side view of my packing ring.
Figure 3:
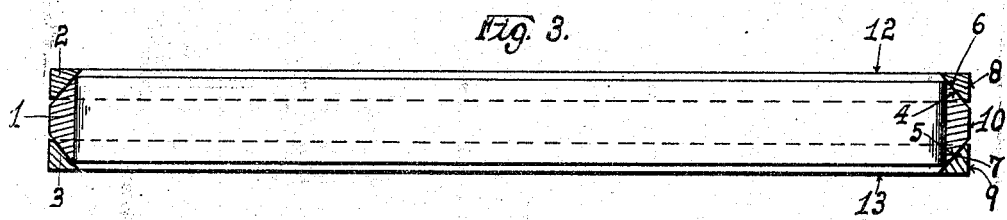
Figure 3 is a section of my piston packing ring taken on line 3—3 of Figure 2.

The preferred form of my piston packing ring as shown in Figs. 1 to 3 inclusive, includes three annular split ring members, an intermediate ring member 1, an upper ring member 2 and a lower ring member 3. The intermediate member 1 has outer upper and lower beveled faces 4 and 5. The ring members 2 and 3 have inner beveled faces 6 and 7 which engage the faces 4 and 5 of member 1 with their peripheries 8 and 9 flush with the periphery 10 of ring member 1. The width of the periphery 10 of ring member 1 is substantially the same as the width of the peripheries 9 and 10 of ring members 2 and 3, thus equalizing the peripheral engaging action of said members.

The ring is placed in the piston groove 11 with the upper side 12 of ring member 2 engaging the upper side of said groove and the lower surface 13 of ring member 3 engaging the lower side of said groove. The ring members expand diametrically so that their peripheries engage the surface of the cylinder and the members 2 and 3 expand axially so that their upper and lower sides engage the upper and lower sides of the piston groove 11, thus taking up the wear of the cylinder and the sides of the piston grooves. The bevelled faces 6 and 7 of the ring members 2 and 3 respectively terminate short of the bearing surface of the ring members thereby forming an oil groove between each of the said ring members and the intermediate ring member.

Figure 4:
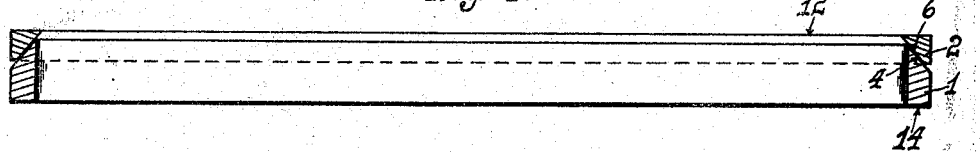
Figure 4 is a section corresponding to Figure 3 of a modified form of my packing ring.

In the form of my ring shown in Fig. 4, I eliminate the ring member 3 and the beveled surface 5 and form the lower side 14 of the ring member 1 straight to engage the lower side of the piston groove 11 the upper side 12 of ring member 2 engaging the upper side of said groove.

Having described my invention, I claim:

In a resilient split packing ring, the combination of a major intermediate ring member and two minor side ring members, all of said members having cylinder bearing surfaces of substantially the same width, the said major, intermediate ring member having its opposite sides bevelled from the inner, upper and lower edges uninterruptedly to the cylinder bearing surface thereof and each of the said minor side ring members having their inner surfaces beveled from a point substantially distant from the cylinder bearing surfaces thereof and said bevels continuing uninterruptedly to the upper and lower edges respectively thereof.

In testimony whereof I affix my signature.

JOSEPH A. BARRIER.